United States Patent [19]
Gale et al.

[11] Patent Number: 5,587,864
[45] Date of Patent: Dec. 24, 1996

[54] SHORT CIRCUIT AND GROUND FAULT PROTECTION FOR AN ELECTRICAL SYSTEM

[75] Inventors: Allan R. Gale, Allen Park; Craig B. Toepfer, Dearborn, both of Mich.

[73] Assignee: Ford Motor Company, Dearborn, Mich.

[21] Appl. No.: 225,872

[22] Filed: Apr. 11, 1994

[51] Int. Cl.$^6$ ..................................................... H02H 3/32
[52] U.S. Cl. .............................. 361/44; 361/48; 361/57
[58] Field of Search ............................... 361/62, 63, 64, 361/65, 42–50, 57

[56] References Cited

U.S. PATENT DOCUMENTS

| | | | |
|---|---|---|---|
| 3,617,808 | 11/1971 | Yoder | 361/45 |
| 3,786,311 | 1/1974 | Hobson, Jr. et al. | 361/45 |
| 3,851,216 | 11/1974 | Clarke et al. | 361/45 |
| 4,121,269 | 10/1978 | Hobson, Jr. | 361/44 |
| 4,540,939 | 9/1985 | Osborne | 324/127 |
| 4,683,513 | 7/1987 | Miller | 361/50 |
| 4,685,022 | 8/1987 | Nichols, III et al. | 361/44 |
| 5,270,897 | 12/1993 | McDonald et al. | 361/45 |
| 5,426,554 | 6/1995 | Nocentino, Jr. et al. | 361/64 |

Primary Examiner—Jeffrey A. Gaffin
Assistant Examiner—Ronald W. Leja
Attorney, Agent, or Firm—Mark S. Sparschu

[57] ABSTRACT

A three-phase electrical system includes an interrupt controller. The interrupt controller protects against inadvertent current flow between a phase conductor and ground and between phase conductors. The interrupt controller measures the voltage across a series connection of current transformers disposed about various phase conductors. If an inadvertent current path exists between one of the phase conductors and ground or between two of the phase conductors, the interrupt controller interrupts the current flow in the phase conductors. Additionally, a single-phase electrical system with a hot conductor and a neutral conductor includes an interrupt controller. The interrupt controller protects against inadvertent current flow between the hat conductor and ground and between the hot conductor and the neutral conductor. The interrupt controller measures the voltage across a series connection of current transformers disposed about the hot and neutral conductors. If an inadvertent current path exists between the hot conductors and ground or between the hot conductor and the neutral conductor, the interrupt controller interrupts the current flow in the hot and neutral conductors.

12 Claims, 1 Drawing Sheet

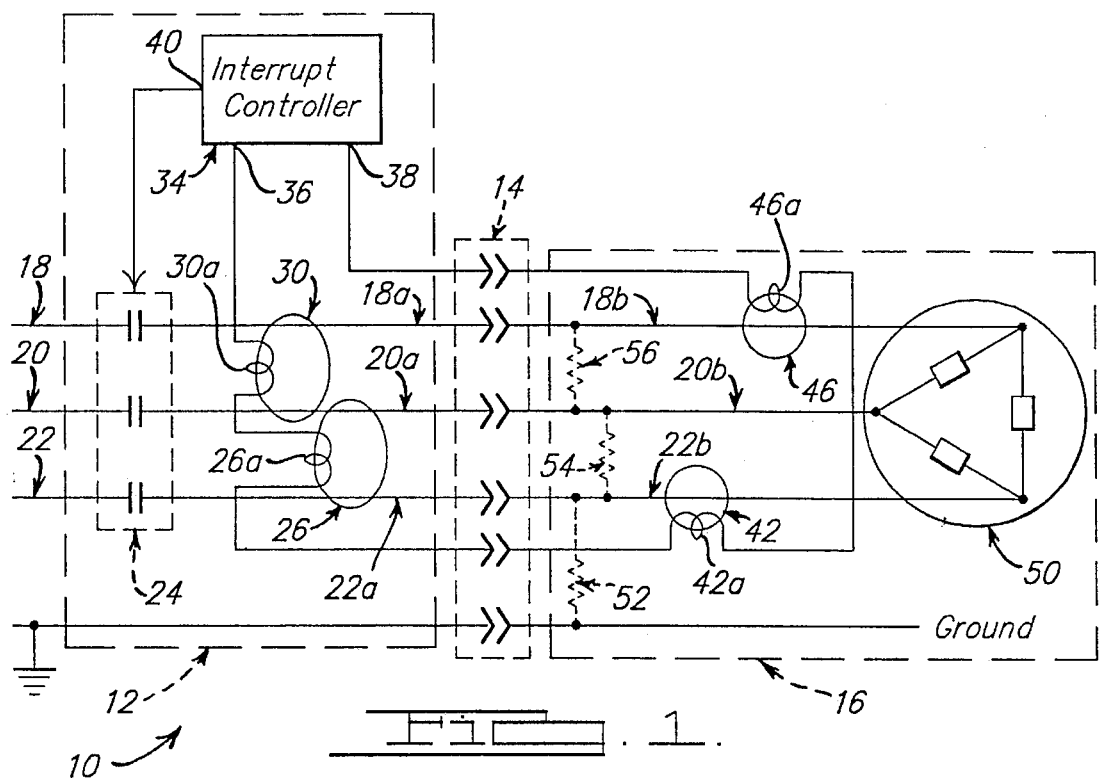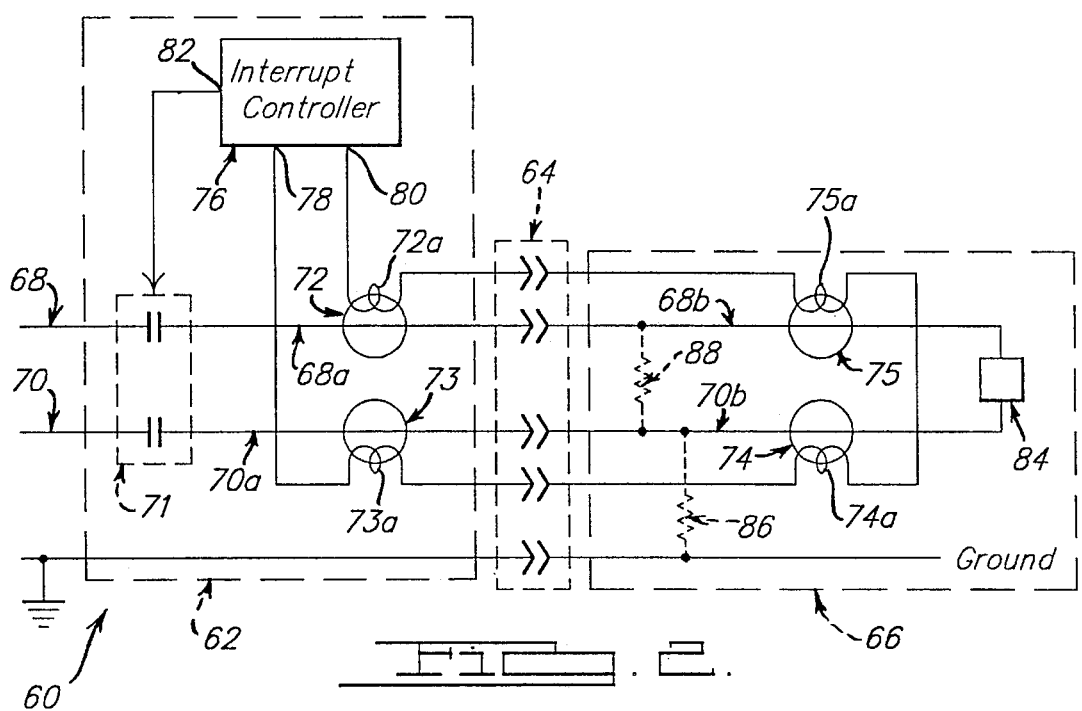

SHORT CIRCUIT AND GROUND FAULT PROTECTION FOR AN ELECTRICAL SYSTEM

BACKGROUND OF THE INVENTION

1. Field of the Invention

The present invention relates generally to electrical systems and more particularly to short circuit and ground fault protection for electrical systems.

2. Description of the Related Art

When electrical power in an electrical system is provided from an outlet, a potential hazard of electric shock exists for a person who plugs a device into the outlet or unplugs a device from the outlet. One such hazard involved is that the person accidentally touches a "hot" conductor of the electrical system. A "hot" conductor is one which is at a non-zero voltage. If the person touches a hot conductor, the person can present an inadvertent path to ground (a "ground fault") for electrical current in the hot conductor. If a single-phase electrical system is at issue, there is a single hot conductor. In a three-phase electrical system, on the other hand, there are three hot conductors.

A device which can be employed to detect a ground fault is a ground fault circuit interrupter (GFCI). A GFCI measures a sum of the currents in all current-carrying conductors in the electrical system. If the currents do not add to zero, the GFCI concludes that some current is being shunted through an inadvertent path to ground. The GFCI then quickly opens the current-carrying conductors. GFCIs for single-phase systems are commonly used in household electrical systems. Further, U.S. Pat. No. 4,685,022, issued to Nichols, III et al., discloses a GFCI for a three-phase electrical system.

However, there is a hazard which a GFCI cannot protect against. A person can accidently place himself between two current-carrying conductors. In a single-phase system, that would be manifested by the person placing himself between the hot conductor and the "neutral" (or return) conductor. In a three-phase system, the situation would be manifested by the person placing himself between two hot conductors. Where such an inadvertent current path exists between two current-carrying conductors (referred to herein as a "short circuit"), the sum of the currents in the current-carrying conductors of the electrical system is still zero. As a result, a GFCI would not be able to detect that an inadvertent current path exists. However, an electrical shock hazard clearly exists in this case.

A fault detection system which detects inadvertent current flow both between a hot conductor and ground and between two current-carrying conductors would therefore provide an advantage over the prior art. The advantage would be a reduced hazard of electric shock from inadvertent current flow between current-carrying conductors.

SUMMARY OF THE INVENTION

The present invention provides a three-phase electrical system having a portion which further includes a first phase conductor, a second phase conductor, and a third phase conductor. In addition, the portion includes first current sensing means for sensing a sum of currents in the first and second phase conductors. Also, the portion includes second current sensing means for sensing a sum of currents in the second and third phase conductors.

The present invention also provides a three-phase electrical system having a portion which further has a first phase conductor, a second phase conductor, and a third phase conductor. The portion additionally has first current sensing means for sensing a current in the first phase conductor. The portion further has second current sensing means for sensing a current in the third phase conductor.

The present invention further provides a single-phase electrical system which includes a first conductor, a second conductor, a third conductor electrically coupled in series with the first conductor, and a fourth conductor electrically coupled in series with the second conductor. The electrical system also includes first current sensing means for sensing a current in the first conductor, second current sensing means for sensing a current in the second conductor, third current sensing means for sensing a current in the third conductor and fourth current sensing means for sensing a current in the fourth conductor.

By detecting faults between current-carrying conductors in addition to faults from a conductor to ground, the present invention provides an advantage over the prior art. The advantage is a reduced hazard of electrical shock from inadvertent current flow between current-carrying conductors.

BRIEF DESCRIPTION OF THE DRAWINGS

FIG. 1 is a schematic diagram of a three-phase electrical system according to one embodiment of the present invention.

FIG. 2 is a schematic diagram of a single-phase electrical system according to another embodiment of the present invention.

DETAILED DESCRIPTION OF THE PREFERRED EMBODIMENT

Referring to FIG. 1, a three-phase electrical system 10 according to one embodiment of the present invention is presented. Three-phase electrical system 10 comprises a power source portion 12, a connector 14 and a load portion 16.

Power source portion 12 has three phase conductors 18, 20 and 22, each conductor connected to one phase of an external three-phase electrical source (not shown). Conductors 18, 20 and 22 enter a contactor 24 capable of interrupting current flow in conductors 18, 20 and 22. Conductors 18a, 20a and 22a emerge from contactor 24. Conductors 18a, 20a and 22a terminate in one half of connector 14.

Disposed around both conductor 20a and 22a is a current transformer 26, a device for sensing current. Current transformer 26 has an output coil 26a. A voltage is developed in coil 26a proportional to the time-derivative of the sum of the currents in conductors 20a and 22a.

Disposed around both conductor 18a and conductor 20a is a second current transformer 30. Current transformer 30 has an output coil 30a. A voltage is developed in coil 30a proportional to the time-derivative of the sum of the currents in conductor 18a and conductor 20a.

Power source portion 12 also has an interrupt controller 34. Interrupt controller 34 has two inputs 36 and 38 across which interrupt controller 34 can measure voltage. Interrupt controller 34 further has an output 40 which is connected to a coil (not shown) in contactor 24. Interrupt controller 34 can thus open and close the contacts within contactor 24.

Load portion 16 comprises three conductors 18b, 20b and 22b. Conductors 18b, 20b and 22b terminate at one end in connector 14. Preferably, conductors 18b, 20b and 22b are within a power cord which contains one half of connector 14. The two halves of connector 14 are joined when connection of load portion 16 to source portion 12 is desired.

Disposed about conductor 22b is a current transformer 42. Current transformer 42 has an output coil 42a. Disposed about conductor 18b is a current transformer 46. Current transformer 46 has an output coil 46a.

A three-phase electrical load 50 is connected to conductors 18b, 20b and 22b. In the preferred embodiment of the present invention, load 50 is a battery charger for the traction batteries of an electrically-driven vehicle.

Coils 26a, 30a, 42a and 46a are connected in series. However, the polarity of coils 26a and 46a is opposite from the polarity of coils 30a and 42a. The series combination of coils 26a, 30a, 42a and 46a is connected across inputs 36 and 38 of interrupt controller 34.

Operation of electrical system 10 is as follows. When connection of electrical load 50 is desired, load portion 16 is connected to source portion 12 via connector 14. In the preferred embodiment of the present invention, this connection is accomplished by a person inserting a plug into an electrical outlet.

When connection is so accomplished, current will flow in the various conductors previously described. The following nomenclature will be used in referring to the currents:

| Name | Current |
| --- | --- |
| $i_{18a}$ | Current in conductor 18a |
| $i_{20a}$ | Current in conductor 20a |
| $i_{22a}$ | Current in conductor 22a |
| $i_{18b}$ | Current in conductor 18b |
| $i_{20b}$ | Current in conductor 20b |
| $i_{22b}$ | Current in conductor 22b |

For consistency, the positive sense of all currents discussed in this disclosure will be from left to right in the Figures.

Due to current flow in conductors 20a and 22a, an output voltage of current transformer 26 will be developed across coil 26a. That voltage is $$v_{26} = k_{26} N_{26a}^2 \frac{d(i_{20a} + i_{22a})}{dt}, \tag{1}$$

where $v_{26}$ is the voltage developed across coil 26a, $k_{26}$ is a transformer constant for current transformer 26 and $N_{26a}$ is the number of turns of coil 26a.

Current transformer 30 will have a voltage output of $$v_{30} = -k_{30} N_{30a}^2 \frac{d(i_{18a} + i_{20a})}{dt}, \tag{2}$$

where $v_{30}$ is the voltage developed across coil 30a, $k_{30}$ is a transformer constant for current transformer 30 and $N_{30a}$ is the number of turns of coil 30a. The negative sign appears in Equation (2) due to the fact that coil 30a is connected opposite in polarity to coil 26a, as has been previously discussed.

Also, the voltage output of current transformer 42 is $$v_{42} = -k_{42} N_{42a}^2 \frac{di_{22b}}{dt}, \tag{3}$$

where $v_{42}$ is the voltage developed across coil 42a, $k_{42}$ is a transformer constant for current transformer 42 and $N_{42a}$ is the number of turns of coil 42a. As with Equation (2), Equation (3) contains a negative sign to reflect the polarity of connection of coil 42a.

In addition, the voltage output of current transformer 46 is $$v_{46} = k_{46} N_{46a}^2 \frac{di_{18b}}{dt}, \tag{4}$$

where $v_{46}$ is the voltage developed across coil 46a, $k_{46}$ is a transformer constant for current transformer 46 and $N_{46a}$ is the number of turns in coil 46a. No negative sign appears in Equation (4) because coil 46a is connected with the same polarity as coil 26a, and with an opposite polarity to coils 30a and 42a.

In general, Kirchoff's Current Law demands that the currents at the nodes of load 50 sum to zero. That is:

$$i_{18b} + i_{20b} + i_{22b} = 0. \tag{5}$$

Further, when there is no inadvertent current flow from any of conductors 18a, 18b, 20a, 20b, 22a and 22b to any other conductor or to ground, the following three relationships hold:

$$i_{18a} = i_{18b}, \tag{6a}$$

$$i_{20a} = i_{20b}, \tag{6b}$$

and $$i_{22a} = i_{22b}. \tag{6C}$$

Applying Equations (6a), (6b) and (6c) in conjunction with equation (5) allow us to write the following two equations:

$$i_{18a} + i_{20a} + i_{22b} = 0, \tag{7}$$

and $$i_{18b} + i_{20a} + i_{22a} = 0. \tag{8}$$

Keep in mind that Equations (7) and (8) both hold only when there is no inadvertent current flow from conductors 18a, 18b, 20a, 20b, 22a or 22b to each other or to ground.

We will now assume now that the product of transformer constant times the square of number of turns is equal for current transformers 30 and 42. That is, $$k_{30} N_{30a}^2 = k_{42} N_{42a}^2. \tag{9}$$

Furthermore, the same assumption will be made with respect to current transformers 26 and 46. That is, $$k_{26} N_{26a}^2 = k_{46} N_{46a}^2. \tag{10}$$

Additionally, we will assume that the products of transformer constant times the square of number of turns expressed in Equations (9) and (10) are not equal to each other. That is, $$k_{30} N_{30a}^2 = k_{42} N_{42a}^2 \neq k_{26} N_{26a}^2 = k_{46} N_{46a}^2. \tag{11}$$

We will then multiply Equation (7) by $k_{30} N_{30a}^2$, resulting in:

$$k_{30} N_{30a}^2 i_{18a} + k_{30} N_{30a}^2 i_{20a} + k_{30} N_{30a}^2 i_{22b} = 0. \tag{12}$$

Next, we substitute the results of Equation (9) for the last instance of $k_{30} N_{30a}^2$ in Equation (12) and then group terms. The following results:

$$k_{30}N_{30a}^2(i_{18a}+i_{20a})+k_{42}N_{42a}^2 i_{22b}=0. \qquad (13)$$

As a next step, we differentiate both sides of Equation (13) with respect to time, so now $$k_{30}N_{30a}^2\frac{d(i_{18a}+i_{20a})}{dt} + k_{42}N_{42a}^2\frac{di_{22b}}{dt} = 0. \qquad (14)$$

Recognizing the terms on the left side of Equation (14) as also being contained in Equations (2) and (3), we substitute Equations (2) and (3) into Equation (14). The result is:

$$v_{30}+v_{42}=0. \qquad (15)$$

Now, we multiply Equation (8) by $k_{26}N_{26a}^2$, resulting in:

$$k_{26}N_{26a}^2 i_{18b}+k_{26}N_{26a}^2 i_{20a}+k_{26}N_{26a}^2 i_{22a}=0. \qquad (16)$$

We next substitute the results of Equation (10) for the first instance of $k_{26}N_{26a}^2$ in Equation (16) and group terms. The result is:

$$k_{46}N_{46a}^2 i_{18b}+k_{26}N_{26a}^2(i_{20a}+i_{22a})=0. \qquad (17)$$

Next, we differentiate Equation (17) with respect to time, yielding $$k_{46}N_{46a}^2\frac{di_{18b}}{dt} + k_{26}N_{26a}^2\frac{d(i_{20a}+i_{22a})}{dt} = 0. \qquad (18)$$

Recognizing the two terms on the left side of Equation (18) as also contained in Equations (1) and (4), we substitute Equations (1) and (4) into Equation (18). The result is:

$$v_{26}+v_{46}=0. \qquad (19)$$

Finally, adding Equations (15) and (19), we find that $$v_{26}+v_{30}+v_{42}+v_{46}=0. \qquad (20)$$

Because coils 26a, 30a, 42a and 46a of current transformers 26, 30, 42 and 46 are connected in series, the sum of $v_{26}$, $V_{30}$, $V_{42}$ and $V_{46}$ in fact appears across inputs 36 and 38 of interrupt controller 34.

Thus, the voltage read by interrupt controller 34 across inputs 36 and 38 should be zero (or substantially zero, to account for any electrical noise which might be present) if there is no inadvertent current flow from conductors 18a, 18b, 20a, 20b, 22a and 22b.

However, consider now the case of an inadvertent current path 52 between conductor 22b and ground. In that case, Equation (6c) no longer holds, nor does Equation (8). Since Equation (8) does not hold, Equation (19) (a consequence of Equation (8)) also does not hold. So, $$V_{26}+V_{46}\neq 0. \qquad (21)$$

However, Equation (7) continues to hold, so Equation (15 (a consequence of Equation (7)) continues to hold. That is, $$v_{30}+v_{42}=0. \qquad (15)$$

So, adding Equations (15) and (21), we find that:

$$V_{26}+V_{30}+V_{42}+V_{46}\neq 0. \qquad (22)$$

So, interrupt controller 34 will read a non-zero voltage across inputs 36 and 38.

Consider now an inadvertent current path (not shown in FIG. 1) between conductor 20b and ground. In that case, Equation (6b) no longer holds. As a result, Equations (7) and (8) also do not hold. Therefore, Equations (15) and (19) (consequences of Equations (7) and (8)) do not hold. So, $$v_{26}+v_{46}\neq 0 \qquad (23)$$

and $$v_{30}+v_{42}\neq 0. \qquad (24)$$

Although it is not immediately obvious that the sum of Equations (23) and (24) is necessarily non-zero, it can be shown that adding Equations (23) and (24) necessarily yields:

$$v_{26}+v_{30}+v_{42}+v_{46}\neq 0. \qquad (25)$$

This result is a consequence of: 1) the polarities of coils 26a and 46a being opposite from the polarities of coils 30a and 42a; and 2) the assumptions regarding transformer constants and number of coil turns set forth in Equations (9) through (11). Interrupt controller 34 will therefore again read a non-zero voltage across inputs 36 and 38.

Consider now an inadvertent current path (not shown in FIG. 1) between conductor 18b and ground. In that case, Equation (6a) no longer holds. As a result, Equation (7) also no longer holds. As a result, Equation (15) (a consequence of Equation (7)) no longer holds. So, $$v_{30}+v_{42}\neq 0. \qquad (26)$$

However, Equation (8) continues to hold, as does Equation (19) (a consequence of Equation (8)). So, $$v_{26}+v_{46}=0. \qquad (19)$$

So, adding Equations (19) and (26) yields:

$$v_{26}+V_{30}+V_{42}+V_{46}\neq 0. \qquad (27)$$

Interrupt controller 34 will therefore again read a non-zero voltage across inputs 36 and 38.

Consider now an inadvertent current path 54 between conductor 20b and conductor 22b (i.e., across two phases). In that case, Equations (6b) and (6c) no longer hold because of inadvertent current path 54. As a result, Equation (7) also no longer holds. As a result, Equation (15) (a consequence of Equation (7)) no longer holds. So, $$V_{30}+V_{42}0. \qquad (28)$$

However, Equation (8) continues to hold, as does Equation (19) (a consequence of Equation (8)). So, $$v_{26}+v_{46}=0. \qquad (19)$$

Adding Equations (19) and (28) yields:

$$v_{26}+v_{30}+v_{42}+v_{46}\neq 0. \qquad (29)$$

Interrupt controller 34 will therefore again read a non-zero voltage across inputs 36 and 38.

Consider now an inadvertent current path 56 between conductor 18b and conductor 20b. In that case, Equations (6a) and (6b) no longer hold because of inadvertent current path 56. As a result, Equation (8) no longer holds. Since Equation (8) does not hold, Equation (19) (a consequence of Equation (8)) also does not hold. So, $$v_{26}+v_{46}\neq 0. \qquad (30)$$

However, Equation (7) continues to hold, so Equation (15) (a consequence of Equation (7)) continues to hold. That is, $$v_{30}+v_{42}=0. \tag{15}$$

Adding Equations (15) and (30), we find that:

$$v_{26}+v_{30}+v_{42}+v_{46}\neq 0. \tag{31}$$

So, interrupt controller 34 will read a non-zero voltage across inputs 36 and 38.

Consider now an inadvertent current path (not shown in FIG. 1) between conductor 18b and conductor 22b. In that case, Equations (6a) and (6c) no longer hold because of inadvertent current path 56. As a result, neither Equation (7) nor Equation (8) continues to hold. As a result, neither Equation (15) nor Equation (19) (consequences of Equations (7) and (8)) continue to hold. That is, $$v_{30}v_{42}\neq 0. \tag{32}$$

and $$v_{26}+v_{46}\neq 0. \tag{33}$$

Although it is not immediately obvious that the sum of Equations (32) and (33) is necessarily non-zero, it can be shown that adding Equations (32) and (33) necessarily yields:

$$v_{26}+v_{30}+v_{42}+v_{46}\neq 0. \tag{34}$$

This result is a consequence of: 1) the polarities of coils 26a and 46a being opposite from the polarities of coils 30a and 42a; and 2) the assumptions regarding transformer constants and number of coil turns set forth in Equations (9) through (11). Interrupt controller 34 will therefore again read a non-zero voltage across inputs 36 and 38.

As can be seen, in the case of both inadvertent current paths between a phase and ground (a "ground fault") and inadvertent current paths between two phases (a "short circuit"), the present invention allows the existence of the inadvertent current paths to be detected. The inadvertent current paths are detected by measurement of a non-zero voltage across inputs 36 and 38 of interrupt controller 34.

When interrupt controller 34 does in fact detect an inadvertent current path, interrupt controller 34 opens the contacts in contactor 24 via output 40. As a result, power to conductors 18a, 18b, 20a, 20b, 22a and 22b is interrupted.

A modification to the embodiment of the invention just described should come to mind to one skilled in the arts to which the present invention pertains. It was pointed out that current transformers 26, 30, 42 and 46 have voltage outputs proportional to time-derivative of current. However, current-sensing devices which have an output proportional to current, rather than to time-derivative of current can be used to equivalent advantage. This fact is apparent through a review of the derivation carried out above in Equations (1) through (11).

Another embodiment of the present invention is illustrated in FIG. 2. FIG. 2 illustrates a single-phase electrical system 60. Single-phase electrical system 60 comprises a source portion 62, a connector 64 and a load portion 66. A neutral conductor 68 and a hot conductor 70 supply electrical power in system 60. Conductors 68 and 70 terminate in contactor 71, out of which come conductors 68a and 70a. Conductors 68a and 70a terminate in one half of connector 64. Disposed about conductor 68a is current transformer 72, a device for sensing current. Current transformer 72 has an output coil 72a. Disposed about conductor 70a is a current transformer 73 with an output coil 73a.

Source portion 62 also comprises interrupt controller 76. Interrupt controller 76 has inputs 78 and 80, across which interrupt controller 76 can measure voltage. Through output 82, interrupt controller 76 can cause contactor 71 to interrupt current to conductors 68a and 70a.

Load portion 66 comprises conductors 68b and 70b. Conductors 68b and 70b each terminate at one end in one half of connector 64. At each of their other ends, conductors 68b and 70b terminate in load 84. Load 84 is any single-phase electrical load. Disposed about conductor 70b is a current transformer 74 with an output coil 74a. Disposed about conductor 68b is a current transformer 75 with an output coil 75a.

Output coils 72a, 73a, 74a and 75a are connected in series. Output coils 72a and 74a are connected with the same polarity, and the opposite polarity to output coils 73a and 75a. The series connection of output coils 72a, 73a, 74a and 75a is connected across inputs 78 and 80 of interrupt controller 76.

It is assumed that for current transformers 72 and 74, and for current transformers 73 and 75, the product of transformer constant times square of number of turns is equal, i.e., $$k_{72}N_{72a}^2=k_{74}N_{74a}^2 \tag{35}$$

and $$k_{73}N_{73a}^2=k_{75}N_{75a}^2. \tag{36}$$

Additionally, we will assume that the products of transformer constant times the square of number of turns expressed in Equations (35) and (36) are not equal to each other. That is, $$k_{72}N_{72a}^2=k_{74}N_{74a}^2\neq k_{73}N_{73a}^2k_{75}N_{75a}^2. \tag{37}$$

Operation of electrical system 60 is as follows. When no inadvertent current path exists in the system, interrupt controller 76 will read a zero voltage (or nearly zero, to account for electrical noise) across inputs 78 and 80. However, when a ground fault occurs between at conductor 70b (illustrated by inadvertent current path 86), interrupt controller 76 will read a non-zero voltage across inputs 78 and 80. Further, if a short circuit occurs between conductors (illustrated by inadvertent current path 88), interrupt controller will also read a non-zero voltage across inputs 78 and 80.

If interrupt controller 76 reads a non-zero voltage across inputs 78 and 80, interrupt controller 76 causes contactor 71 to open via output 82. Current flow to conductors 68a, 68b, 70a, and 70b is therefore interrupted.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A three-phase electrical system comprising a portion which further comprises:

a first phase conductor;

a second phase conductor;

a third phase conductor;

first current sensing means for sensing a current only in said first phase conductor; and second current sensing means for sensing a current only in said third phase conductor; wherein said first current sensing means comprises a first current transformer disposed about said first phase conductor; and said second current sensing means comprises a second current transformer disposed about said third phase conductor; and said first and second current transformers have a different product of transformer constant and square of number of coil turns.

2. A three-phase electrical system as recited in claim 1 wherein said first current transformer and said second current transformer are electrically coupled to one another.

3. A three-phase electrical system as recited in claim 2 wherein said first and second current transformers are coupled to one another with opposite polarity.

4. A three-phase electrical system comprising a portion which further comprises:
   a first phase conductor;
   a second phase conductor;
   a third phase conductor;
   first current sensing means for sensing a sum of currents in said first and second phase conductors; and
   second current sensing means for sensing a sum of currents in said second and third phase conductors;
   fault detection means electrically coupled to said first current sensing means and said second current sensing means for electrically opening at least one of said phase conductors; wherein
   said first current sensing means comprises a first current transformer disposed about said first and second phase conductors;
   said second current sensing means comprises a second current transformer disposed about said second and third phase conductors; and
   said first and second current transformers have a different product of transformer constant and square of number of coil turns.

5. A three-phase electrical system as recited in claim 4 further comprising a load portion which further comprises:
   a fourth phase conductor electrically coupled to said first phase conductor;
   a fifth phase conductor electrically coupled to said second phase conductor;
   a sixth phase conductor electrically coupled to said third phase conductor;
   third current sensing means for sensing a current in said fourth phase conductor; and
   fourth current sensing means for sensing a current in said sixth phase conductor.

6. A three-phase electrical system as recited in claim 5 wherein said third current sensing means and said fourth current sensing means are electrically coupled to said fault detection means.

7. A three-phase electrical system as recited in claim 6 wherein:
   said third current sensing means comprises a third current transformer disposed about said fourth phase conductor; and
   said fourth current sensing means comprises a fourth current transformer disposed about said sixth phase conductor.

8. A three-phase electrical system as recited in claim 7 wherein:
   said first and second current transformers are coupled to said fault detection means with opposite polarity;
   said third and fourth current transformers are coupled to said fault detection means with opposite polarity;
   said third current transformer is coupled to said fault detection means with the same polarity as said second current transformer;
   said fourth current transformer is coupled to said fault detection means with the same polarity as said first current transformer;
   said third and fourth current transformers have a different product of transformer constant and square of number of coil turns;
   said third current transformer and said second current transformer have substantially the same product of transformer constant and square of number of coil turns; and
   said fourth current transformer and said first current transformer have substantially the same product of transformer constant and square of number of coil turns.

9. A three-phase electrical system as recited in claim 8 wherein said first current transformer, said second current transformer, said third current transformer and said fourth current transformer are electrically coupled in series.

10. A single-phase electrical system comprising:
   a first conductor;
   a second conductor;
   a third conductor electrically coupled in series with said first conductor;
   a fourth conductor electrically coupled in series with said second conductor;
   first current sensing means for sensing a current in said first conductor;
   second current sensing means for sensing a current in said second conductor;
   third current sensing means for sensing a current in said third conductor;
   fourth current sensing means for sensing a current in said fourth conductor;
   fault detection means responsively coupled to said first current sensing means, said second current sensing means, said third current sensing means and said fourth current sensing means for electrically opening at least one of said conductors; wherein
   said first current sensing means comprises a first current transformer disposed about said first conductor;
   said second current sensing means comprises a second current transformer disposed about said second conductor;
   said third current sensing means comprises a third current transformer disposed about said third conductor;
   said fourth current sensing means comprises a fourth current transformer disposed about said fourth conductor;
   said first and said fourth current transformers have substantially the same product of transformer constant and square of number of coil turns; and
   said second and said third current transformers have substantially the same product of transformer constant and square of number of coil turns, said product being different than the product for said first and fourth current transformers.

11. A single-phase electrical system as recited in claim 10 wherein:
   said first and said fourth current transformers are coupled to said fault detection means with the same polarity; and
   said second and said third current transformers are coupled to said fault detection means with the same polarity, said polarity being different than the polarity for said first and fourth current transformers.

12. A single-phase electrical system as recited in claim 11 wherein said first, second, third and fourth current transformers are coupled in series.

* * * * *